(12) United States Patent
Wan et al.

(10) Patent No.: US 11,606,257 B2
(45) Date of Patent: Mar. 14, 2023

(54) TOPOLOGY-AWARE CONTROL INFORMATION DISSEMINATION IN SOFTWARE-DEFINED NETWORKING ENVIRONMENTS

(71) Applicant: VMware, Inc., Palo Alto, CA (US)

(72) Inventors: Da Wan, Beijing (CN); Qi Wu, Beijing (CN); Donghai Han, Beijing (CN); Jianjun Shen, Redwood City, CA (US); Pankaj Thakkar, Cupertino, CA (US); Mengdie Song, Beijing (CN); Haoran Chen, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/283,823

(22) Filed: Feb. 25, 2019

(65) Prior Publication Data
US 2020/0220784 A1  Jul. 9, 2020

(30) Foreign Application Priority Data
Jan. 9, 2019 (WO) ................ PCT/CN2019/070977

(51) Int. Cl.
*H04L 41/12* (2022.01)
*H04L 41/0803* (2022.01)

(52) U.S. Cl.
CPC .......... *H04L 41/12* (2013.01); *H04L 41/0803* (2013.01)

(58) Field of Classification Search
CPC ..................... H04L 41/12; H04L 41/0803
See application file for complete search history.

(56) References Cited

U.S. PATENT DOCUMENTS

| | | | |
|---|---|---|---|
| 9,450,817 B1* | 9/2016 | Bahadur | H04L 41/0806 |
| 2005/0276251 A1* | 12/2005 | Biddiscombe | H04L 41/12 |
| | | | 370/338 |
| 2006/0026272 A1* | 2/2006 | Sullivan | H04L 67/2823 |
| | | | 709/246 |
| 2006/0159083 A1* | 7/2006 | Ward | H04L 45/02 |
| | | | 370/389 |
| 2011/0035474 A1* | 2/2011 | Elzur | H04L 41/082 |
| | | | 709/221 |

(Continued)

OTHER PUBLICATIONS https://www.kodyaz.com/t-sql/prevent-duplicate-rows-in-table-using-merge-in-sql-trigger.aspx, posted on May 14, 2018 (Year: 2018).*

*Primary Examiner* — Scott B Christensen
(74) *Attorney, Agent, or Firm* — Su IP Consulting

(57) ABSTRACT

Example methods and systems for a network management entity to perform topology-aware control information dissemination in a software-defined networking (SDN) environment. The method may comprise obtaining group topology information specifying a network group, and a network configuration object that references the network group. The method may also comprise: processing the group topology information to identify, from multiple members of the network group, a first member that is relevant to a first host; and processing the group topology information to identify, from the multiple members, a second member that is irrelevant to the first host. The method may further comprise: generating and sending, to the first host, control information associated with a subset of the network group. The subset may include the first member but exclude the second member.

18 Claims, 9 Drawing Sheets

(56) References Cited

U.S. PATENT DOCUMENTS

| | | | |
|---|---|---|---|
| 2014/0098673 A1* | 4/2014 | Lee | H04L 45/126 370/238 |
| 2016/0094383 A1* | 3/2016 | Wang | G06F 16/951 709/221 |
| 2016/0157043 A1* | 6/2016 | Li | H04L 41/12 370/254 |
| 2016/0165454 A1* | 6/2016 | Li | H04W 16/18 370/254 |
| 2016/0357416 A1* | 12/2016 | Abuduweili | H04L 41/12 |
| 2017/0180422 A1* | 6/2017 | Mizutani | H04L 63/20 |
| 2018/0007007 A1* | 1/2018 | Bansal | H04L 63/0263 |
| 2018/0337839 A1* | 11/2018 | Bristow | H04L 43/062 |
| 2020/0042609 A1* | 2/2020 | Huang | G06F 16/24552 |

* cited by examiner

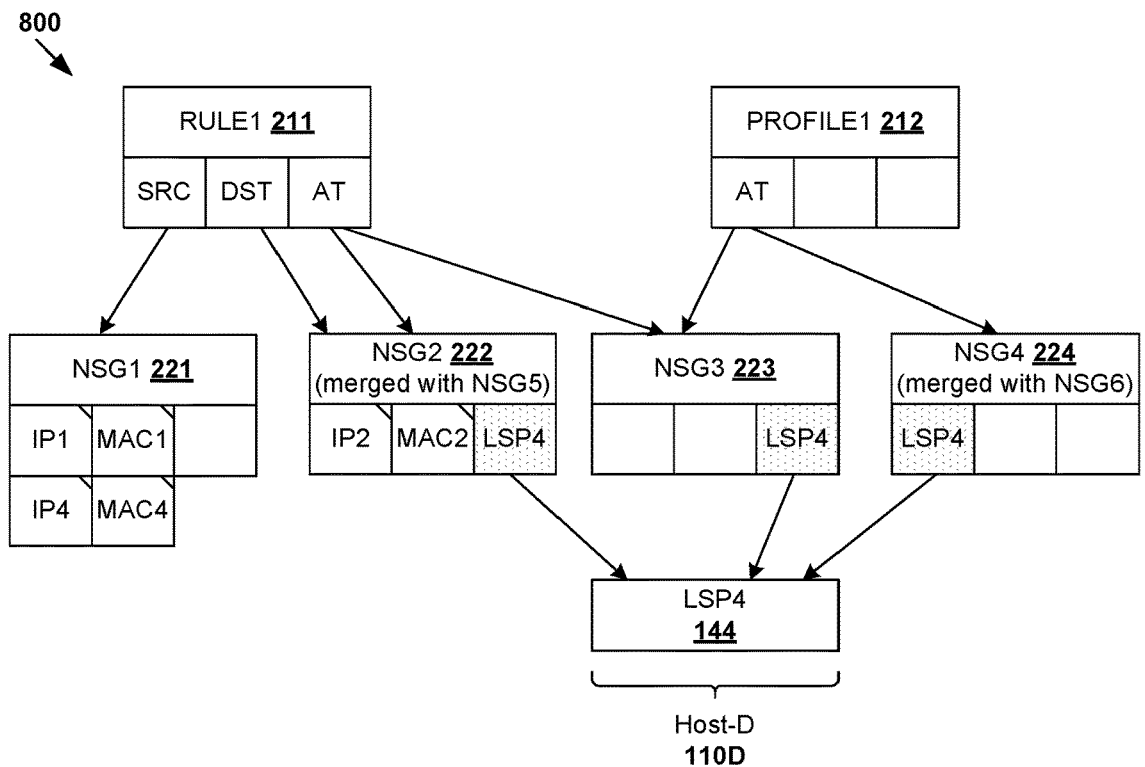
Fig. 8A
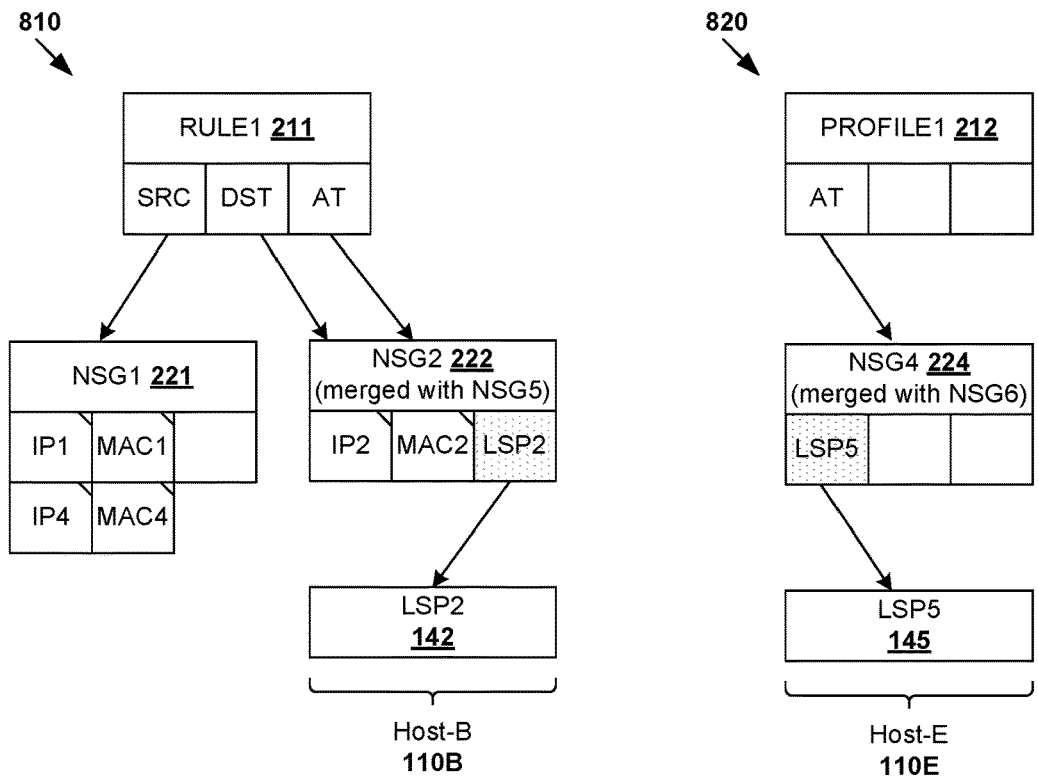
Fig. 8B
Fig. 8C

TOPOLOGY-AWARE CONTROL INFORMATION DISSEMINATION IN SOFTWARE-DEFINED NETWORKING ENVIRONMENTS

CROSS-REFERENCE TO RELATED APPLICATION

The present application claims the benefit of Patent Cooperation Treaty (PCT) Application No. PCT/CN2019/070977, filed Jan. 9, 2019, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtual machines running different operating systems may be supported by the same physical machine (also referred to as a "host"). Each virtual machine is generally provisioned with virtual resources to run an operating system and applications. The virtual resources may include central processing unit (CPU) resources, memory resources, storage resources, network resources, etc.

In practice, a network management entity may be deployed to disseminate control information to hosts in the SDN environment in order to support various network operations, such as firewall rule implementation for network security purposes, etc. However, as the scale and complexity of the SDN environment increases, the amount of control information received by each host may also increase significantly, which may affect the performance of the hosts.

BRIEF DESCRIPTION OF DRAWINGS

FIG. 8A is a schematic diagram illustrating first example host-centric group topology information associated with a first host;

FIG. 8B is a schematic diagram illustrating second example host-centric group topology information associated with a second host;

FIG. 8C is a schematic diagram illustrating third example host-centric group topology information associated with a third host.

DETAILED DESCRIPTION

Figure 1:
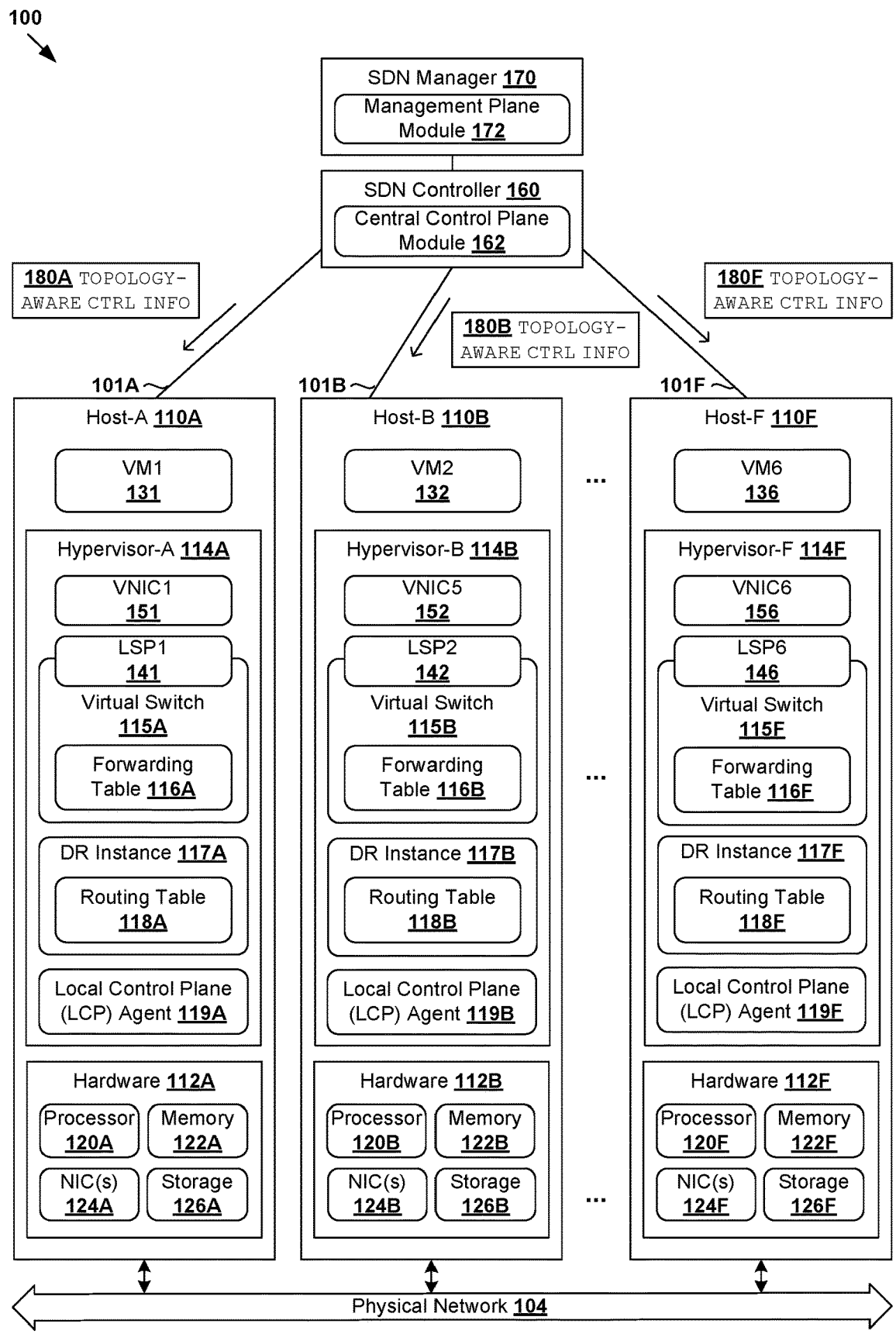
FIG. 1 is a schematic diagram illustrating an example software-defined networking (SDN) environment in which topology-aware control information dissemination may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to control information dissemination or publication will now be explained in more detail using FIG. 1, which is a schematic diagram illustrating example software-defined networking (SDN) environment 100 in which topology-aware control information dissemination may be performed. It should be understood that, depending on the desired implementation, SDN environment 100 may include additional and/or alternative components than that shown in FIG. 1. SDN environment 100 includes multiple hosts 110A-F that are inter-connected via physical network 104. In practice, SDN environment 100 may include any number of hosts (also known as a "host computers", "host devices", "physical servers", "server systems", "transport nodes," etc.), where each host may be supporting tens or hundreds of virtual machines (VMs). For simplicity, host-A 110A, host-B 110B and host-F 110F are shown in detail. It should be understood that other hosts 110C-E (shown in FIG. 2) may include similar components to the ones described below, or any alternative and/or additional component(s).

Each host 110A/110B/110F may include suitable hardware 112A/112B/112F and virtualization software (e.g., hypervisor-A 114A, hypervisor-B 114B, hypervisor-F 114C) to support various VMs. For example, hosts 110A-F may support respective VMs 131-136 (see also FIG. 2). Hypervisor 114A/114B/114F maintains a mapping between underlying hardware 112A/112B/112F and virtual resources allocated to respective VMs. Hardware 112A/112B/112F includes suitable physical components, such as central processing unit(s) (CPU(s)) or processor(s) 120A/120B/120F; memory 122A/122B/122F; physical network interface controllers (NICs) 124A/124B/124F; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNIC1 151, VNIC2 152 and VNIC6 156 are virtual network adapters for VMs 131, 132, and 136, respectively, and are emulated by corresponding VMMs (not shown for simplicity) instantiated by their respective hypervisor at respective host-A 110A, host-B 110B and host-F 110F. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-F may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114F implements virtual switch 115A/115B/115F and logical distributed router (DR) instance 117A/117B/117F to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-F and represented internally using forwarding tables 116A-F at respective virtual switches 115A-F. Forwarding tables 116A-F may each include entries that collectively implement the respective logical switches. Further, logical DRs that provide logical layer-3 connectivity may be implemented collectively by DR instances 117A-F and represented internally using routing tables 118A-F at respective DR instances 117A-F. Routing tables 118A-F may each include entries that collectively implement the respective logical DRs.

Packets may be received from, or sent to, each VM via an associated logical port. For example, logical switch ports 141-146 are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-F in FIG. 1, whereas a "virtual switch" may refer generally to a software switch or software implementation of a physical switch. In practice, there is usually a one-to-one mapping between a logical port on a logical switch and a virtual port on virtual switch 115A/115B/115F. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM2 132 on host-B 110B may be connected to the same logical switch and located on the same logical layer-2 segment, such as a segment with VXLAN network identifier (VNI)=6000.

SDN controller 160 and SDN manager 170 are example network management entities in SDN environment 100. One example of an SDN controller is the NSX controller component of VMware NSX® (available from VMware, Inc.) that operates on a central control plane. SDN controller 160 may be a member of a controller cluster (not shown for simplicity) that is configurable using SDN manager 170 operating on a management plane. Network management entity 160/170 may be implemented using physical machine(s), VM(s), or both. Logical switches, logical routers, and logical overlay networks may be configured using SDN controller 160, SDN manager 170, etc. To send or receive control information, local control plane (LCP) agent 119A/119B/119F on host 110A/110B/110F may interact with central control plane (CCP) module 162 at SDN controller 160 via control-plane channel 101A/101B/101F.

Hosts 110A-F may also maintain data-plane connectivity among themselves via physical network 104 to facilitate communication among VMs located on the same logical overlay network. Hypervisor 114A/114B/114F may implement a virtual tunnel endpoint (VTEP) (not shown) to encapsulate and decapsulate packets with an outer header (also known as a tunnel header) identifying the relevant logical overlay network (e.g., using a VXLAN (or "virtual" network identifier (VNI) added to a header field). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B), hypervisor-F 114F implements a third VTEP with (IP-F, MAC-F, VTEP-F), etc. Encapsulated packets may be sent via an end-to-end, bi-directional communication path (known as a tunnel) between a pair of VTEPs over physical network 104.

To facilitate configuration management in SDN environment 100, network groups of any suitable size and member type(s) may be defined at management and/or control planes. Some examples will be discussed using FIG. 2, which is a schematic diagram illustrating example group topology information 200 based on which topology-aware control information may be performed in SDN environment. In this example, multiple network and security groups (NSGs) labelled "NSG1" 221 to "NSG6" 226 are configured. In practice, a member of a group may be any suitable logical entity or network information, such as an IP address, a MAC address, a logical switch port, a logical switch, a logical router, or any combination thereof. For example, first group NSG1 221 includes members [IP address=IP1, MAC address=MAC1, LSP1], where [LSP1] identifies a logical switch port (LSP) connected to VM1 131 on host-A 110A. Similarly, NSG3 223 includes [IP3, MAC3, LSP4], where [LSP4] identifies LSP4 144 connected to VM4 134 on host-D 110D.

In a nested group configuration, a (child or descendant) group may be a member of a (parent) group. For example, NSG2 222 is a nested group that includes [IP2, LSP4, NSG5], where NSG5 225 further includes [LSP2, LSP3, MAC2]. In other words, members of child=NSG5 225 are indirect members of parent=NSG2 222. In another example, NSG4 224 includes [LSP4, NSG6], where NSG 226 further includes [LSP5, LSP6]. [LSP2, LSP3, LSP5, LSP6] may identify respective logical switch ports LSP2 142 connected to VM2 132 at host-B 110B, LSP3 143 connected to VM3 133 at host-C 110C, LSP5 145 connected to VM5 135 at host-E 110E and LSP6 146 connected to VM6 136 at host-F 110F.

To facilitate configuration management, groups 221-226 may be "consumed" or referenced by any suitable network configuration object, such as a firewall rule (e.g., RULE1 211), a profile (e.g., PROFILE1 212), etc. For example, when a user wishes to apply a firewall rule to some logical entities, they could define a group of entities and apply the firewall rule to the group instead of having to apply the same rule to each entity one by one. In another example, when the user wishes to define a firewall rule between different source-destination pairs, the firewall rule may be defined using a group of source addresses and a group of destination addresses. This way, the configuration process may be more efficient because it is not necessary to create a separate firewall rule for each and every source-destination pair.

To implement network configuration objects 211-212, a network management entity such as SDN controller 160 may disseminate control information associated with groups 221-226 to hosts 110A-F. Conventionally, one simple approach is to send a full set of control information associated with groups 221-226 to hosts 110A-F in SDN environment 100, regardless of whether the control information is required. However, as the scale and complexity of SDN environment 100 increases, the amount of control information received by each host also increases significantly. The increased processing burden may adversely affect the performance of the hosts, such as in terms of CPU and memory performance. The configuration of nested groups generally further exacerbates this problem.

Topology-Aware Control Information Dissemination

According to examples of the present disclosure, control information dissemination or publication may be improved using a topology-aware approach. Here, the term "topology-aware" may refer generally to an approach that is based on group topology information associated with network groups in SDN environment 100. The term "group topology information" may refer generally to any suitable information specifying network group(s) and network configuration object(s) referencing the network group(s). In the example in FIG. 2, a visual representation of example group topology information 200 specifies how network configuration objects 211-212 (also known as group consumers) reference network groups 221-226.

Figure 2:
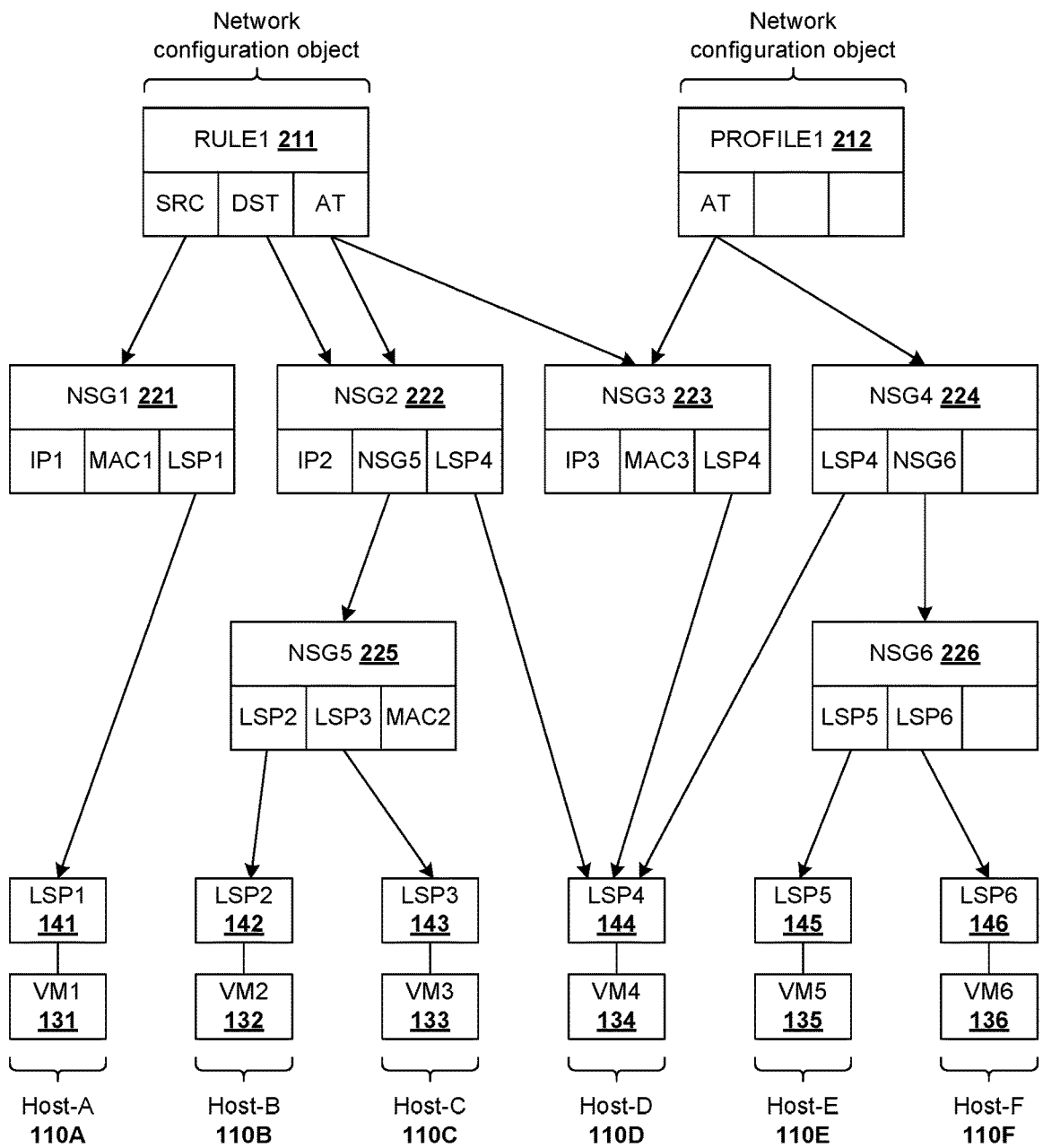
FIG. 2 is a schematic diagram illustrating example group topology information based on which topology-aware control information dissemination may be performed in an SDN environment.
Figure 3:
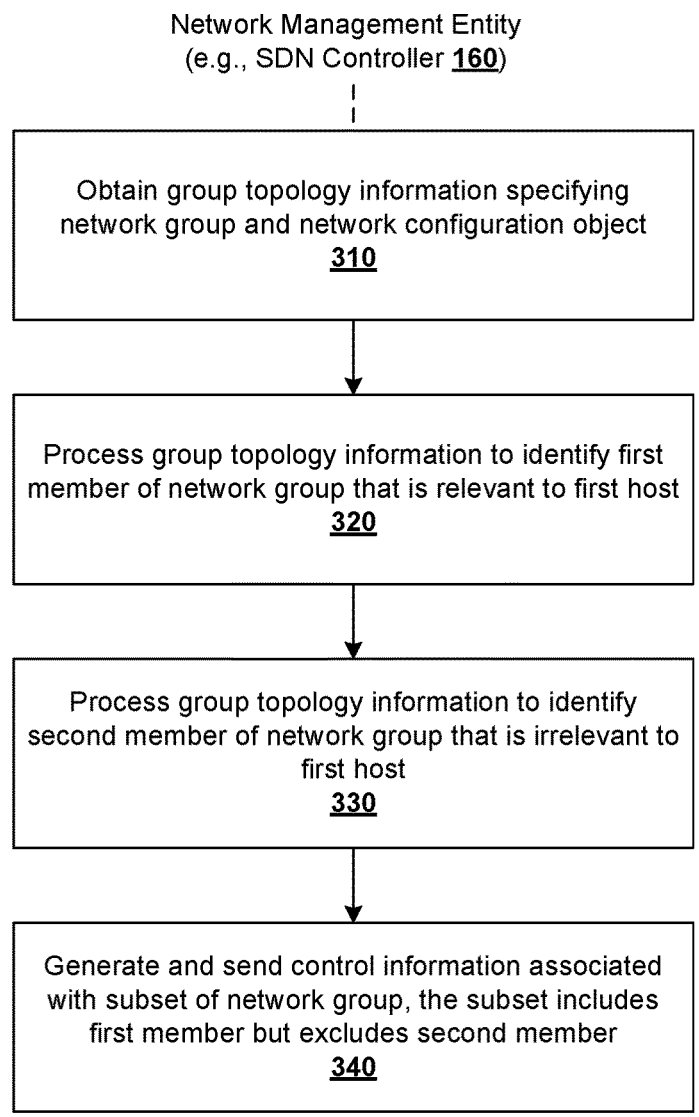
FIG. 3 is a flowchart of an example process for a network management entity to perform topology-aware control information dissemination in an SDN environment.

By considering group topology information 200, SDN controller 160 may assess whether it is necessary to send a full set of control information associated with each and every group member to hosts 110A-F in the example in FIG. 2. This way, a publication-based system that is adaptive based on group topology information 200 may be implemented. In more detail, FIG. 3 is a flowchart of example process 300 for a network management entity to perform topology-aware control information dissemination in SDN environment 100. Example process 300 may include one or more operations, functions, or actions illustrated by one or more blocks, such as 310 to 340. The various blocks may be combined into fewer blocks, divided into additional blocks, and/or eliminated depending on the desired implementation. In practice, example process 300 may be implemented using any suitable network management entity, such as SDN controller 160 using CCP module 162, SDN manager 170 using management plane module 172, etc.

In the following, an example will be described using NSG1 221 as an example "network group," RULE1 211 as a "network configuration object," host-B 110B as a "first host," host-C 110C or host-D 110D as a "second host." Throughout the present disclosure, it should be understood that although the terms "first" and "second" are used to describe various elements, these elements should not be limited by these terms. These terms are used to distinguish one element from another. For example, a first element may be referred to as a second element, and vice versa. Any one of hosts 110A-F may perform the role of a "first host" or a "second host."

At 310 in FIG. 3, SDN controller 160 may obtain group topology information 200 specifying network group=NSG1 221, and network configuration object=RULE1 211 that references NSG1 221 during an implementation of RULE1 211. Here, the term "obtain" may refer generally to SDN controller 160 retrieving the group topology information from any suitable source, such as local memory or storage, remote storage, another entity (e.g., SDN manager 170), etc. The group topology information may be in any suitable format, such as graph (e.g., FIG. 2), table, linked list, etc.

At 320 and 330 in FIG. 3, SDN controller 160 may process group topology information 200 to identify at least one first member of NSG1 221 that is relevant to host-B 110B, and at least one second member that is irrelevant to host-B 110B during the implementation of RULE1 211. At 340, SDN controller 160 may send, to host-B 110B, topology-aware control information associated with a subset of NSG1 221 that includes the first (relevant) member but excludes the second (irrelevant) member. In practice, it should be understood that any suitable number of "first member" and "second member" may be identified to reduce the volume of the control information.

In the example in FIG. 2, the first members that are relevant to host-B 110B may be source address information [IP1, MAC1] to which RULE1 211 is applicable when implemented by host-B 110B. The second member that is irrelevant to host-B 110B may be [LSP1], which identifies logical switch port LSP1 141 supported by host-A 110A. As will be discussed further below, RULE1 211 may be implemented by host-B 110B, host-C 110C and host-D 110D based on an "Applied To" (AT) field of RULE1 211. As such, SDN controller 160 may send host-B 110B control information associated with a subset of NSG1 221 that includes [IP1, MAC1] but excludes [LSP1]. See 180B in FIG. 1.

As will be described further below, examples of the present disclosure may be implemented to reduce the volume of control information (see 180A-F) sent to respective hosts 110A-F. Using examples of the present disclosure, SDN controller 160 may determine whether control information associated with a particular member of a network group is relevant to hosts 110A-F. This should be contrasted against conventional approaches that may (blindly) inundate each and every host with the full set of control information.

For example, if a network group has 100 logical switch ports but a particular host only supports 10 of them, the host generally does not need the control information associated with the other 90 logical switch ports. The reduction in the volume of control information may be more apparent as the number and size of network groups in of SDN environment 100 increase. This way, the processing burden on hosts 110A-F may be reduced, which may instead dedicate more CPU and memory resources to support operations of respective VMs 131-136. The overhead on control-plane channels 101A-F may also be reduced.

It should be understood that examples of the present disclosure may be implemented for any suitable "member," "network group," and "network configuration object." Another example of a "network group" may be a cluster configuration entity that includes many nodes within a particular cluster. In this case, a particular node may only require control information in the form of a cluster ID, and common configuration information. It is not necessary for the node to be aware of other nodes in the cluster. In this case, example of the present disclosure may be performed to eliminate members that are irrelevant to the node to reduce, if not minimize, the control information required. In the following, various examples will be discussed using FIGS. 4-9.

Flattening and Translation

Figure 4:
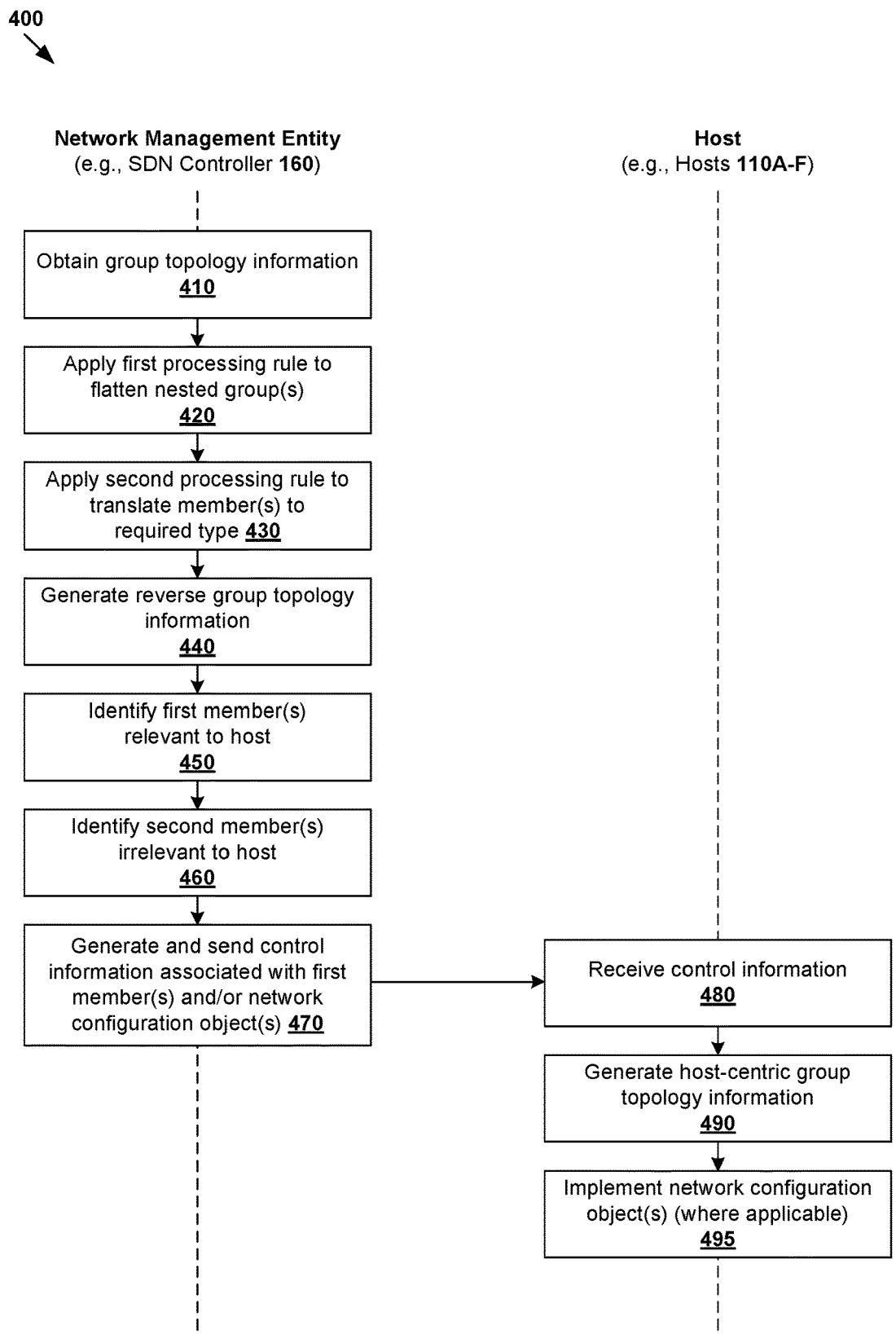
FIG. 4 is a flowchart of an example detailed process for a network management entity to perform topology-aware control information dissemination in an SDN environment.

FIG. 4 is a flowchart of example process 400 of topology-aware control information dissemination in SDN environment 100. Example process 400 may include one or more operations, functions, or actions illustrated at 410 to 495. The various operations, functions or actions may be combined into fewer blocks, divided into additional blocks, and/or eliminated depending on the desired implementation. Example process 400 may be performed by any suitable network management entity, such as SDN controller 160 using CCP module 162, SDN manager 170 using management plane module 172, etc.

At 410, 420 and 430 in FIG. 4, SDN controller 160 may obtain group topology information associated with groups 221-226, and process the group topology information according to various processing rules for optimization purposes. According to a first processing rule (see 420), SDN controller 160 may "flatten" a nested group (i.e., a parent group with at least one child group) by merging or consolidating member(s) of the child group into its parent group.

Any suitable approach may be used for group flattening. For example, block 420 may involve a bottom-to-top graph traversal to identify a child group (e.g., NSG5 225) based on the group topology information, and iteratively merge the child group with each of its parent group(s) until the topmost parent group is reached. Alternatively or additionally, a top-to-bottom graph traversal may be performed to identify a topmost parent group (e.g., NSG2 222 that has no parent), and iteratively merge the parent group with each of its child group(s) until the bottommost child group is reached. In both cases, the flattening process may be repeated until each child group is merged with their parent group(s). After flattening, there will be just one group node between each rule node and any number of logical switch port nodes.

Figure 5:
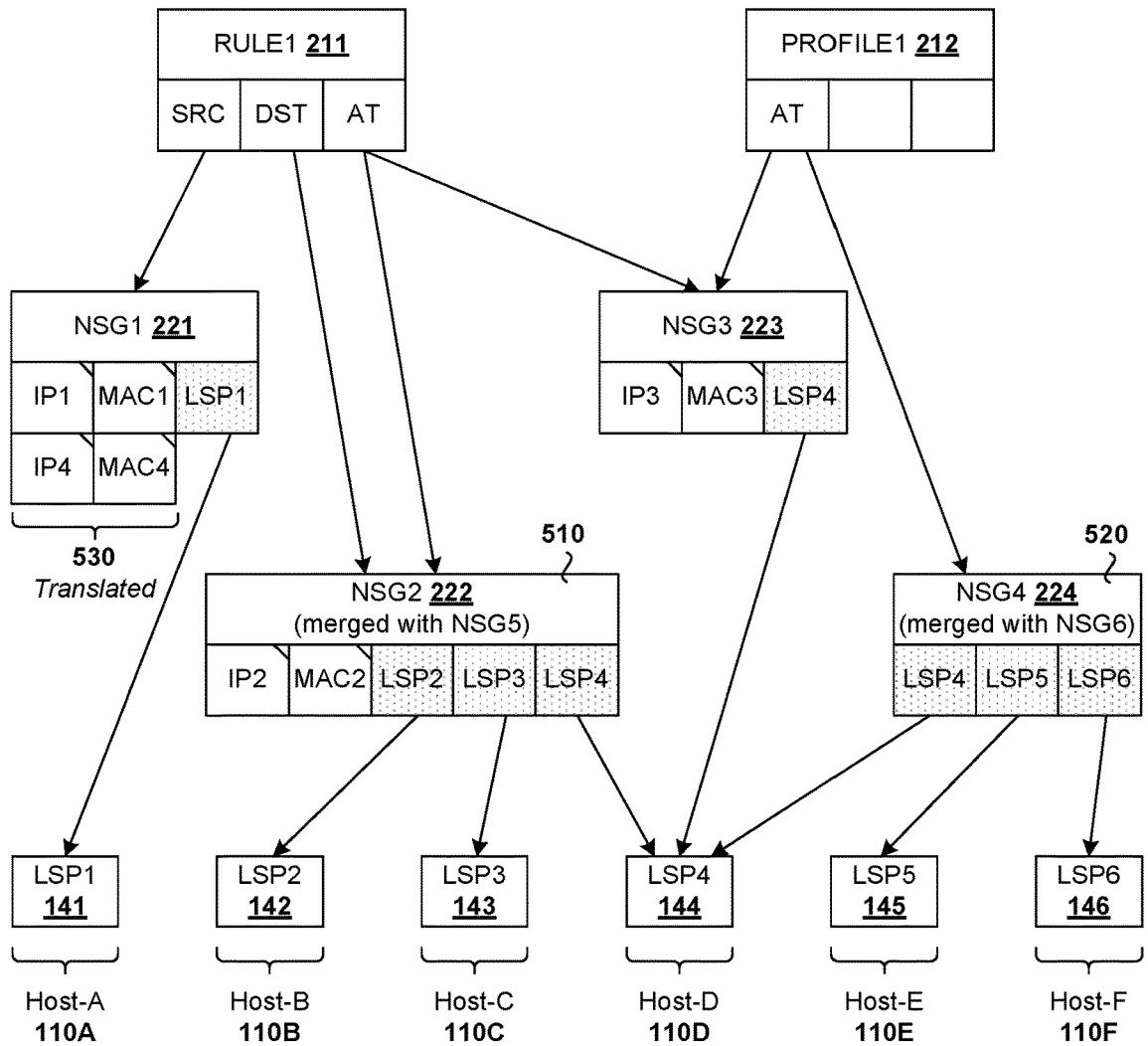
FIG. 5 is a schematic diagram of example processing of group topology information by performing flattening and translation.

Some examples will be discussed using FIG. 5, which is a schematic diagram of example processing 500 of group topology information 200 by performing flattening and translation. In the example in FIG. 5, parent group NSG2 222 may be flattened by merging with child group NSG5 225, resulting in a single-layer group with members=[IP2, MAC2, LSP2, LSP3, LSP4]. Further, NSG4 224 and NSG6 226 may be merged into a single-layer group with [LSP4, LSP5, LSP6]. See 510-520 in FIG. 5.

According to a second processing rule (see 430), SDN controller 160 may translate a particular member into a required type associated with a field of network configuration object 211/212. For example, RULE1 211 is a firewall rule that is defined using a source (SRC) field that references NSG1 221 and a destination (DST) field that references NSG2 222. Further, an applied-to (AT) field references both NSG2 222 and NSG3 223.

For the SRC and DST fields, only IP/MAC address-type members of a group are applicable in order for a firewall engine to implement RULE1 211, which involves matching source and destination address information in a packet with the address-type members. In the example in FIG. 5, since the SRC field of RULE1 211 is mapped to NSG1 221, SDN controller 160 may determine that entity-type member [LSP1] in NSG1 221 does not match with the required type (i.e., address information) of the SRC field. In this case, [LSP1] may be translated to its corresponding IP/MAC address information, such as IP4 and MAC4 (i.e., translated members). See 530 in FIG. 5.

In practice, other entity-type members of a group may be translated into their corresponding address information, provided their IP/MAC address binding is available. For example, members [LSP2, LSP3, LSP4] in NSG2 222 (after merging with NSG5 225) may be translated into [IP-LSP2, MAC-LSP2], [IP-LSP3, MAC-LSP3] and [IP-LSP4, MAC-LSP4], respectively. Similar translation may be performed for [LSP4, LSP5, LSP6] in NSG3 223 and/or NSG4 224 (after merging with NSG6 226). These examples are not shown in FIG. 5 for simplicity.

Reverse Group Topology Information

At 440 in FIG. 4, SDN controller 160 may generate reverse group topology information based on group topology information 200. In practice, the reversal at block 440 may involve removing host-dependent, entity-type member(s) from groups 221-224. However, mapping information is retained to be able to identify a relationship between each entity-type member to its related group(s). Some examples will be discussed using FIG. 6, which is a schematic diagram of example reverse group topology information 600 that is generated based on the example in FIG. 2.

Figure 6:
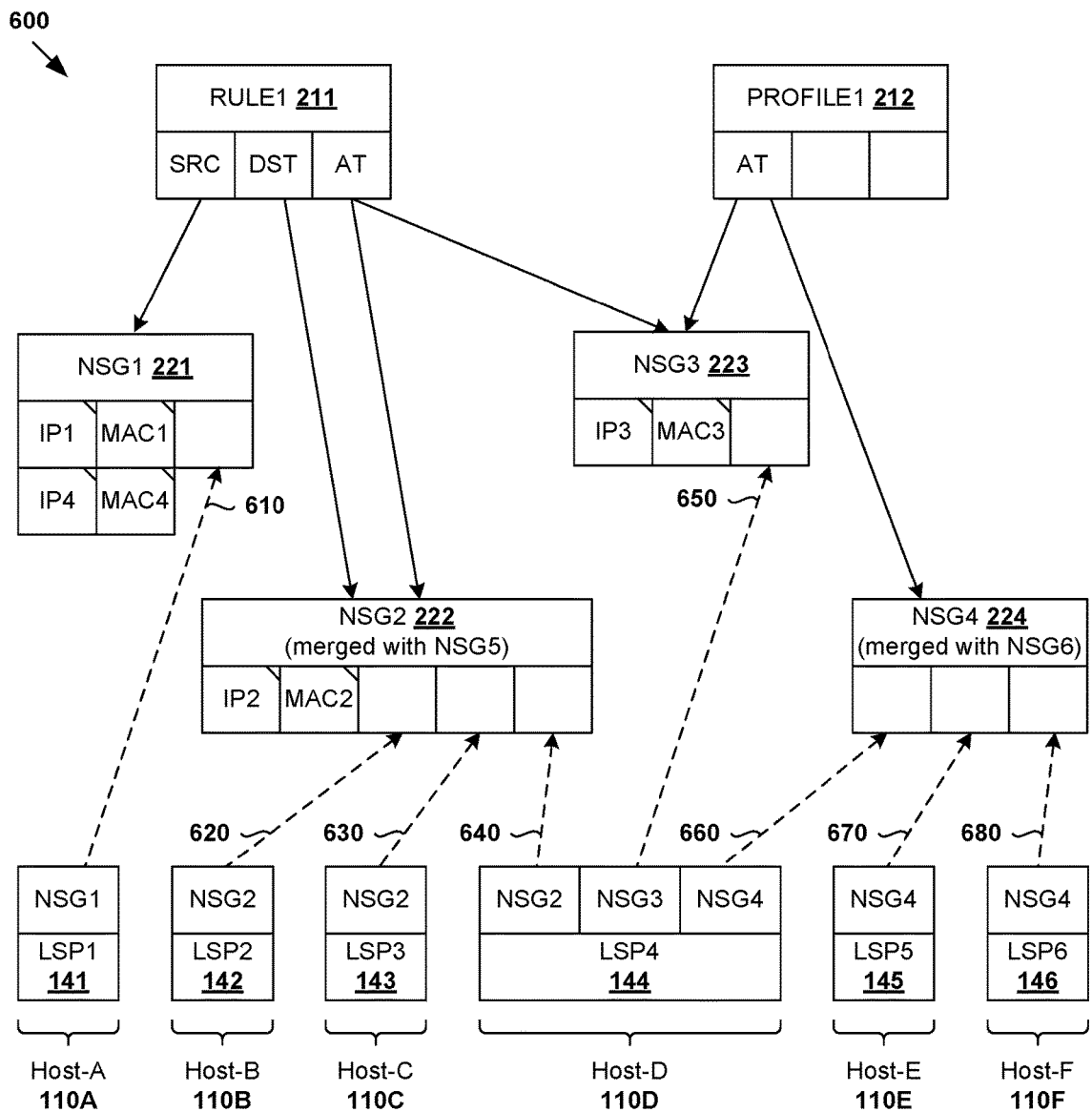
FIG. 6 is a schematic diagram of example reverse group topology information that is generated based on the example in FIG. 2.

Referring first to 610 in FIG. 6, entity-type member [LSP1] is removed from NSG1 221. Address-type members [IP1, MAC1, IP4, MAC4] are host-independent and maintained in NSG1 221. Similarly, at 620, 630 and 640, [LSP2, LSP3, LSP4] are removed from NSG2 222. At 650 and 660, [LSP4] is removed from both NSG3 223 and NSG4 224. At 670 and 680, [LSP5, LSP6] are also removed from NSG4 224. To maintain the group membership information, a reverse mapping may be created from each (removed) entity-type member to its associated group(s). For example, based on a reverse mapping from [LSP1] to NSG1 221 (see 610), LSP1 141 may be identified to be a member of NSG1

221. LSP4 144 may be identified to be a member of NSG2 222, NSG3 223 and NSG4 224 based on respective reverse mappings 640-660.

At 450 and 460 in FIG. 4, based on reverse group topology information 600, SDN controller 160 may identify first member(s) that are relevant to a particular host and second member(s) that are irrelevant to the host during an implementation of a corresponding network configuration object. At 470 in FIG. 4, SDN controller 160 generates and sends control information associated with the relevant first member(s) to the particular host, while excluding irrelevant second member(s). Control information associated with any relevant network configuration object(s) may also be generated and sent. In practice, the "control information" may be any suitable format, such as ID of a logical entity, IP address, MAC address, any combination thereof, etc.

In the following, various examples will be discussed using FIG. 6 and FIG. 7. The relevance of a member of a network group may be determined based on how the network group is consumed by a network configuration object. For example, according to a first requirement, if a network group is used or referenced by an AT field, the corresponding network configuration object will be implemented by entity-type member(s) of the network group. In contrast, its address-type member(s) will be irrelevant based on the AT field. According to a second requirement, if a network group is used or referenced by a SRC or DST field of a network configuration object, its address-type member(s) will relevant to a host implementing the network configuration object. In practice, depending on the network configuration objects, any additional and/or alternative requirement(s) may be considered.

(a) Implementation of RULE1

For host-A 110A, SDN controller 160 may identify [LSP1] of NSG1 221 to be relevant because LSP1 141 is supported by host-A 110A. Since the AT field of RULE1 211 does not reference any logical entity supported by host-A 110A, RULE1 211 is not implemented by host-A 110A. As such, host-A 110A does not need to be aware of NSG1 221, its address-type members [IP1, MAC1, IP4, MAC4] and associated RULE1 211. In this case, SDN controller 160 may generate and send control information associated with [LSP1] to host-A 110A. See 690A in FIG. 6.

For host-B 110B, SDN controller 160 may identify [LSP2] to be relevant because LSP2 142 is supported by host-B 110B. Since RULE1 211 is implemented by LSP2 142 based on the AT field of RULE1 211, host-B 110B requires control information associated with RULE1 211, as well as address-type members of NSG1 221 and NSG2 222. As such, SDN controller 160 may generate and send control information associated with subset NSG1*=[IP1, MAC1, IP4, MAC4], and subset NSG2*=[IP2, MAC2] to host-B 110B, where NSG1* represents a subset of NSG1 221 and NSG2* represents a subset of NSG2 222. To facilitate implementation of RULE1 211, the control information may also specify RULE1 211 and LSP2→[NSG2] to notify host-B 110B that LSP2 142 is a member of NSG2 222, which is referenced by the AT field of RULE1 211. See 690B in FIG. 6.

For host-C 110C, SDN controller 160 may identify [LSP3] to be relevant because LSP3 143 is supported by host-C 110C. Since RULE1 211 is implemented by LSP3 143 based on the AT field of RULE1 211, host-C 110C also requires control information associated with RULE1 211, as well as address-type members of NSG1 221 and NSG2 222. As such, SDN controller 160 may generate and send control information associated with subset NSG1*=[IP1, MAC1, IP4, MAC4], subset NSG2*=[IP2, MAC2] and RULE1 211 to host-C 110C. The control information may also specify LSP3→[NSG2] to notify host-C 110C that LSP3 143 is a member of NSG2 222. See 690C in FIG. 6.

(b) Implementation of Both RULE1 and PROFILE1

Figure 7:
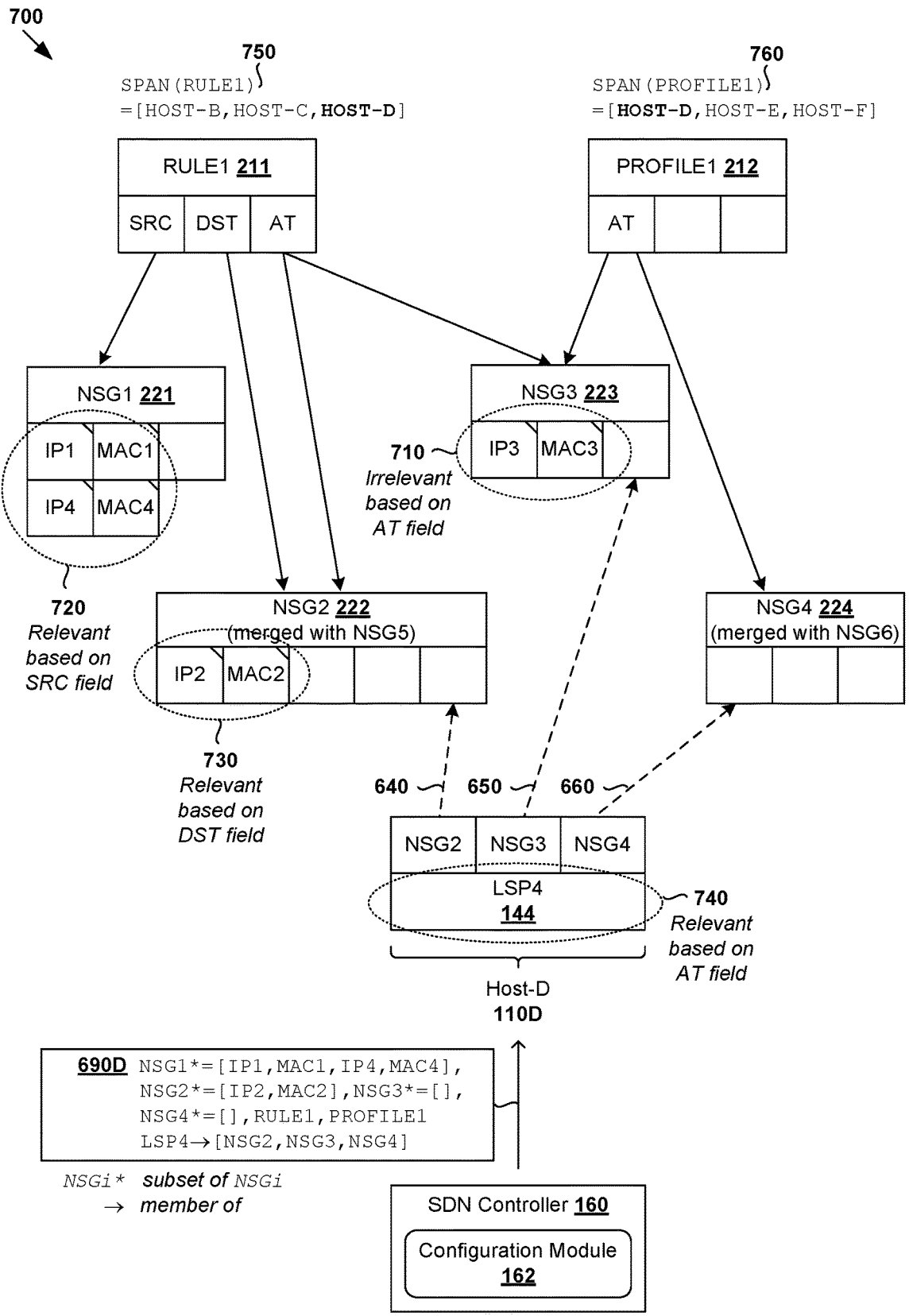
FIG. 7 is a schematic diagram of example reverse group topology information associated with a particular host in FIG. 6.

FIG. 7 is a schematic diagram of example reverse group topology information 700 associated with a particular host in the example in FIG. 6. Similar to FIG. 6, member [LSP1] is removed from NSG1 221. Members [LSP2, LSP3, LSP4] are removed from NSG2 222. Members [IP3, MAC3, LSP4] are removed from NSG3 223. Members [LSP4, LSP5, LSP6] are removed from NSG4 224. Further, reverse mappings are created from [LSP4] to respective NSG2 222, NSG3 223 and NSG4 224 (see 640-660).

In the example in FIG. 7, the AT field of RULE1 211 references both NSG2 222 and NSG3 223. Since LSP4 144 is a member of both groups, RULE1 211 will be implemented at LSP4 144 supported by host-D 110D. Further, the AT field of PROFILE1 212 also references NSG3 223 and NSG4 224. Since LSP4 144 is a member of both groups, PROFILE1 212 will be implemented at LSP4 144.

At shown at 710 in FIG. 7, address-type members=[IP3, MAC3] of NSG3 223 may be excluded because they are irrelevant to the implementation of RULE1 211 and PROFILE1 212. As shown at 720, address-type members=[IP1, MAC1, IP4, MAC4] of NSG1 221 are relevant because they are referenced by the SRC field of RULE1 211. At shown at 730, [IP2, MAC2] of NSG2 222 are relevant because they are referenced by the DST field of RULE1 211. As shown at 740, control information associated with LSP4 144 may be regarded as relevant because host-D 110D supports LSP4 144.

Using the example in FIG. 7, once irrelevant group members are identified, it is not necessary to send their information to host-D 110D. As such, for host-D 110D to implement RULE1 211 and PROFILE1 212, SDN controller 160 may generate and send control information associated with subsets NSG1*=[IP1, MAC1, IP4, MAC4], NSG2*=[IP2, MAC2, LSP4], NSG3*=[ ], NSG4*=[ ] and LSP4→[NSG2, NSG3, NSG4]. This is to notify host-D 110D that LSP4 144 is a member of three groups, but it is not necessary for host-D 110D to be aware of other member(s) of NSG3 223 and NSG4 224 (empty subset is denoted as IF). SDN controller 160 also sends control information associated with RULE1 211 (e.g., specifying the SRC, DST and AT field) and PROFILE1 212 (e.g., specifying the AT field). See 690D in FIG. 6 and FIG. 7.

(c) Implementation of PROFILE1

Referring to FIG. 6 again, the AT field of PROFILE1 212 also references NSG4 224, which includes [LSP5, LSP6]. For host-E 110E to implement PROFILE1 212, SDN controller 160 may send control information associated with subset NSG4*=[ ],LSP5→[NSG4] and PROFILE1 212 to host-E 110E. See 690E in FIG. 6. Similarly, for host-F 110F, SDN controller 160 may send control information associated with subset NSG4*=[ ], LSP6→[NSG4] and PROFILE1 212 to host-F 110F. See 690F in FIG. 6. In both cases, "NSG4*=[1]" indicates to host-E 110E and host-F 110F that they do not need to be aware of other member(s) of NSG4 224.

According to the above examples, it is not necessary to send a full set of control information to each and every host. The span of control information associated with RULE1 211 includes host-B 110B, host-C 110C and host-D 110D (see 750 in FIG. 7). The span of control information associated with PROFILE1 212 includes host-D 110D, host-E 110E and host-F 110F (see 750 in FIG. 7). The span of control information associated with each member of a network group will depend on its relevance to a particular host. This helps to reduce the volume of unnecessary control information, thereby improving efficiency and performance in SDN environment 100.

Host-Centric Group Topology Information

Referring to FIG. 4 again, at 480, in response to receiving control information (e.g., any of 690A-F) from SDN controller, each host may proceed to perform any suitable operation(s) based on the control information. For example, hosts 110B-D may implement RULE1 211 based on control information 690B-D. In another example, hosts 110D-F may implement PROFILE1 212 based on control information 690D-F. Host-A 110A does not implement both RULE1 211 and PROFILE1 212. See also 495 in FIG. 4.

At 490 in FIG. 4, each host (e.g., using an LCP agent) may generate host-centric group topology information based on the control information. In practice, while the reverse group topology information in FIG. 6 and FIG. 7 is useful for identifying the relevance of a group member, it may not be straightforward to identify the membership of each network group. To address this, each host may generate and store its own host-centric group topology information. This also hides the complexity associated with different groups from corresponding network configuration objects. Due to variations in control information 690A-F, hosts 110A-F may each have a different view of the group topology. Some examples will be discussed using FIGS. 8A-C.

FIG. 8A is a schematic diagram illustrating first example host-centric group topology information 800 associated with a first host. As explained using FIG. 6 and FIG. 7, host-D 110D receives control information (see 690D) associated with NSG1*=[IP1, MAC1, IP4, MAC4], NSG2*=[IP2, MAC2], NSG3*=[ ], NSG4*=[ ], RULE1, PROFILE1 and LSP4→[NSG2, NSG3, NSG4]. In this case, host-D 110D may generate the host-centric group topology information in FIG. 8A, which specifies that NSG1 221 includes subset= [IP1, MAC1, IP4, MAC4], NSG2 222 includes subset=[IP2, MAC2], and LSP4 is a member of NSG2 222, NSG3 223 and NSG4 224. The example in FIG. 8A may be subsequently used by host-D 110D to implement RULE 211 and PROFILE1 212. Other unnecessary members are removed.

FIG. 8B is a schematic diagram illustrating second example host-centric group topology information 810 associated with a second host. As explained using FIG. 6, host-B 110B receives control information (see 690B) associated with NSG1*=[IP1, MAC1, IP4, MAC4], NSG2*=[IP2, MAC2], LSP2→[NSG2] and RULE1 211. In this case, host-B 110B may generate the example in FIG. 8B, which specifies that RULE1 211 references NSG1 221 and NSG2 222, LSP2 142 is a member of NSG2 222, NSG1 221 includes subset=[IP1, MAC1, IP4, MAC4] and NSG2 222 includes subset=[IP2, MAC2]. It is not necessary for host-B 110B to be aware of other groups 223-224 and PROFILE1 212. The host-centric group topology information in FIG. 8B may be subsequently used by host-B 110B to implement RULE 211.

FIG. 8C is a schematic diagram illustrating third example host-centric group topology information 820 associated with a third host. As explained using FIG. 6, host-E 110E receives control information (see 690B) associated with NSG4*=[ ], PROFILE1 212 and LSP5→[NSG4]. In this case, host-E 110E may generate the example in FIG. 8C, which specifies that PROFILE1 212 references NSG4 224 and LSP5 145 is a member of NSG4 224. The example in FIG. 8C may be used by host-E 110E to implement PROFILE1 212. It is not necessary for host-E 110E to be aware of other groups 221-223 and RULE 211.

Adaptive Delta Update

Figure 9:
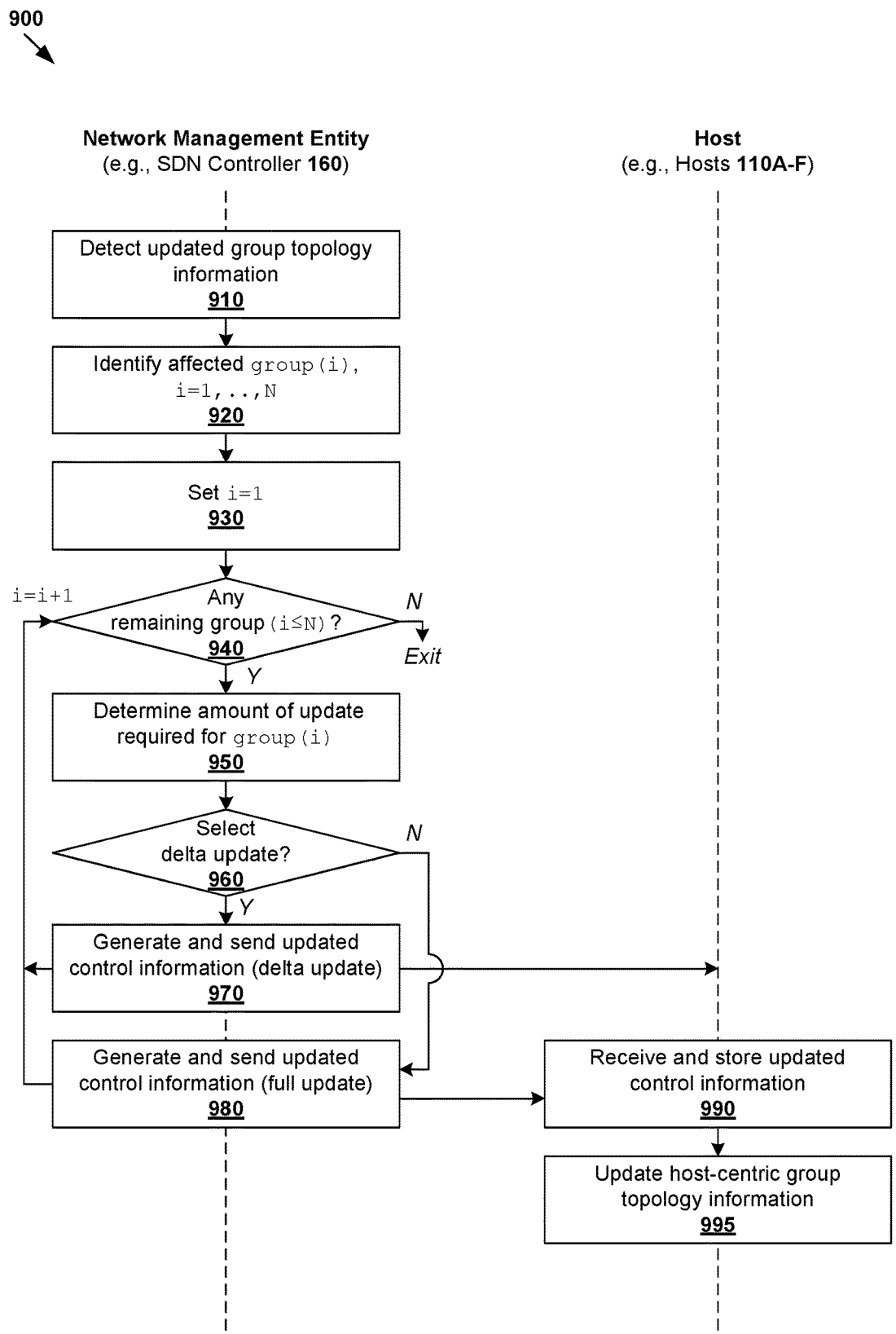
FIG. 9 is a flowchart of an example process for a network management entity to disseminate updated topology-aware control information in an SDN environment.

According to examples of the present disclosure, an improved approach may be performed to update topology-aware control information (e.g., 690A-F) in SDN environment 100. In more detail, FIG. 9 is a flowchart of example process 900 for a network management entity to disseminate updated topology-aware control information in an SDN environment. Example process 900 may include one or more operations, functions, or actions illustrated at 910 to 995. The various operations, functions or actions may be combined into fewer blocks, divided into additional blocks, and/or eliminated depending on the desired implementation. In practice, example process 900 may be implemented using any suitable network management entity 160/170.

At 910 and 920 in FIG. 9, in response to detecting updated group topology information, SDN controller 160 may identify the affected groups (e.g., parent groups), which are denoted as group(i) for i=1, . . . , N. At 930-980, for a particular group(i), SDN controller 160 may select whether to perform a delta update (see 970) or a full update (see 980). The selection may be based on the amount of update required. Blocks 950-980 may be repeated for each affected group(i). At 990 and 995, in response to receiving updated control information from SDN controller 160, the relevant host may update its associated host-centric group topology information.

Using the example in FIG. 9, a delta update or full update may be performed depending on the changes to the topology-aware control information. When a network group includes thousands of members, a single update from a user (e.g., network administrator) might only change some of the members (e.g. adding a new LSP into a group or removing an existing member from a group). For example, consider an example network group with 1000 members, such as [LSP1, LSP2, . . . , LSP1000]. If an update is to remove the first ten members, a delta update may be performed more efficiently than a full update.

In contrast, in response to detecting an update to replace the first 600 LSPs [LSP1, . . . , LSP600] with [LSP1001, . . . , LSP1600], then a full update will be more efficient compared to a delta update. In this case, a delta update will result in 1200 members changes by first deleting [LSP1, . . . , LSP600] and then adding [LSP1001, . . . , LSP1600]). The delta update will be less efficient compared to a full update of replacing the entire group with [LSP601, . . . , LSP1600]. The selection between a delta update and a full update may be performed based on any suitable criterion or criteria.

Container Implementation

Although explained using VMs 131-136, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 9, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 9. For example, a computer system capable of acting as a network management entity may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network management entity to perform topology-aware control information dissemination in a software-defined networking (SDN) environment that includes the network management entity and a plurality of hosts, wherein the method comprises:

configuring a plurality of network groups each to support one or more entity-type members and one or more address-type members, wherein the one or more entity-type members include a logical switch port, a logical switch, and a logical router and the one or more address-type members include an IP address and a MAC address, wherein the one or more entity-type members are different from the one or more address-type members;

configuring a plurality of network configuration objects each to support a first field and a second field, wherein the first field references the one or more address-type members, the second field references the one or more entity-type members, and the first field is different from the second field;

obtaining group topology information specifying a first network group and a second network group from the plurality of network groups, and a network configuration object from the plurality of network configuration objects that references the first network group;

determining that the first network group is referenced by the second field of the network configuration object; and in response to the determining, generating and sending, only to each corresponding host of the plurality of hosts, first control information associated with a corresponding subset of the first network group, wherein the corresponding subset of the first network group includes (1) any entity-type member supported by the corresponding host and (2) any address-type member that matches a required type of the first field of the network configuration object during an implementation of the network configuration object but excludes (1) any entity-type member not supported by the corresponding host and (2) any address-type member that is referenced only by the second field of the network configuration object during the implementation of the network configuration object.

2. The method of claim 1, further comprising:

determining that the second network group is referenced by the first field of the network configuration object but not by the second field; and in response to the determining that the second network group is referenced by the first field but not by the second field, generating and sending, only to the corresponding host second control information associated with a corresponding subset of the second network group, wherein the corresponding subset of the second network group includes any address-type member that matches the required type of the first field during the implementation of the network configuration object but excludes any entity-type member not supported by the corresponding host.

3. The method of claim 1, further comprising:

applying a first processing rule by, in response to determination that the first network group is a parent group, merging the first network group with one or more child groups prior to generating and sending the first control information.

4. The method of claim 1, further comprising:
applying a second processing rule by, in response to determination that the entity-type member does not match with the required type associated with the first field, generating a translated address-type member by translating the entity-type member into the required type.

5. The method of claim 1, further comprising:
based on the group topology information, generating reverse topology information specifying a reverse mapping from the entity-type member to the first network group; and
identifying the entity-type member to be associated with the first network group based on the reverse topology information.

6. The method of claim 1, further comprising:
in response to detecting updated group topology information, determining whether to perform a delta update or a full update of the first control information.

7. A non-transitory computer-readable storage medium that includes a set of instructions which, in response to execution by a processor of a computer system, cause the processor to perform a method of topology-aware control information dissemination in a software-defined networking (SDN) environment that includes the computer system and a plurality of hosts, wherein the method comprises:
configuring a plurality of network groups each to support one or more entity-type members and one or more address-type members, wherein the one or more entity-type members include a logical switch port, a logical switch, and a logical router and the one or more address-type members include an IP address and a MAC address, wherein the entity-type members are different from the address-type members;
configuring a plurality of network configuration objects each to support a first field and a second field, wherein the first field references the one or more address-type members, the second field references the one or more entity-type members, and the first field is different from the second field;
obtaining group topology information specifying a first network group and a second network group from the plurality of network groups, and a network configuration object from the plurality of network configuration objects that references the first network group;
determining that the first network group is referenced by the second field of the network configuration object; and
in response to the determining, generating and sending, only to each corresponding host of the plurality of hosts, first control information associated with a corresponding subset of the first network group, wherein the corresponding subset includes (1) any entity-type member supported by the corresponding host and (2) any address-type member that matches a required type of the first field of the network configuration object during an implementation of the network configuration object but excludes (1) any entity-type member not supported by the corresponding host and (2) any address-type member that is referenced only by the second field of the network configuration object during the implementation of the network configuration object.

8. The non-transitory computer-readable storage medium of claim 7, wherein the method further comprises:
determining that the second network group is referenced by the first field of the network configuration object but not by the second field: in response to the determining that the second network group is referenced by the first field but not by the second field, generating and sending, only to the corresponding host second control information associated with a corresponding subset of the second network group, wherein the corresponding subset of the second network group includes any address-type member that matches the required type of the first field during the implementation of the network configuration object but excludes any entity-type member not supported by the corresponding host.

9. The non-transitory computer-readable storage medium of claim 7, wherein the method further comprises:
applying a first processing rule by, in response to determination that the first network group is a parent group, merging the first network group with one or more child groups prior to generating and sending the first control information.

10. The non-transitory computer-readable storage medium of claim 7, wherein the method further comprises:
applying a second processing rule by, in response to determination that the entity-type member does not match with the required type associated with the first field, generating a translated address-type member by translating the entity-type member into the required type.

11. The non-transitory computer-readable storage medium of claim 7, wherein the method further comprises:
based on the group topology information, generating reverse topology information specifying a reverse mapping from the entity-type member to the first network group; and
identifying the entity-type member to be associated with the first network group based on the reverse topology information.

12. The non-transitory computer-readable storage medium of claim 7, wherein the method further comprises:
in response to detecting updated group topology information, determining whether to perform a delta update or a full update of the first control information.

13. A computer system configured to perform topology-aware control information dissemination in a software-defined networking (SDN) environment that includes the computer system and a plurality of hosts, wherein the computer system comprises:
a processor; and
a non-transitory computer-readable medium having stored thereon instructions that, when executed by the processor, cause the processor to:
configure a plurality of network groups each to support one or more entity-type members and one or more address-type members, wherein the one or more entity-type members include a logical switch port, a logical switch, and a logical router and the one or more address-type members include an IP address and a MAC address, wherein the entity-type members are different from the address-type members;
configure a plurality of network configuration objects each to support a first field and a second field, wherein the first field references the one or more address-type members, the second field references the one or more entity-type members, and the first field is different from the second field;

obtain group topology information specifying a first network group and a second network group from the plurality of network groups, and a network configuration object from the plurality of network configuration objects that references the first network group;

determine that the first network group is referenced by the second field of the network configuration object; and in response to determining that the first network group is referenced by the second field, generate and send, only to each corresponding host of the plurality of hosts, first control information associated with a corresponding subset of the first network group, wherein the corresponding subset includes (1) any entity-type member supported by the corresponding host and (2) any address-type member that matches a required type of the first field of the network configuration object during an implementation of the network configuration object but excludes (1) any entity-type member not supported by the corresponding host and (2) any address-type member that is referenced only by the second field of the network configuration object during the implementation of the network configuration object.

14. The computer system of claim 13, wherein the non-transitory computer-readable medium having stored thereon additional instructions that, when executed by the processor, cause the processor to:

determine that the second network group is referenced by the first field of the network configuration object but not by the second field: in response to determining that the second network group is referenced by the first field but not the second field, generate and send, only to the corresponding host second control information associated with a corresponding subset of the second network group, wherein the corresponding subset of the second network group includes any address-type member that matches the required type of the first field during the implementation of the network configuration object but excludes any entity-type member not supported by the corresponding host.

15. The computer system of claim 13, wherein the instructions further cause the processor to:

apply a first processing rule by, in response to determination that the first network group is a parent group, merging the first network group with one or more child groups prior to generating and sending the first control information.

16. The computer system of claim 13, wherein the instructions further cause the processor to:

apply a second processing rule by, in response to determination that the entity-type member does not match with the required type associated with the first field, generating a translated address-type member by translating the entity-type member into the required type.

17. The computer system of claim 13, wherein the instructions further cause the processor to:

based on the group topology information, generate reverse topology information specifying a reverse mapping from the entity-type member to the first network group; and identify the entity-type member to be associated with the first network group based on the reverse topology information.

18. The computer system of claim 13, wherein the instructions further cause the processor to:

in response to detecting updated group topology information, determine whether to perform a delta update or a full update of the first control information.

* * * * *